United States Patent
Roddy et al.

(10) Patent No.: US 12,307,828 B2
(45) Date of Patent: May 20, 2025

(54) SYSTEMS AND METHODS FOR EVALUATING REPAIR OF ASSETS

(71) Applicant: Transportation IP Holdings, LLC, Norwalk, CT (US)

(72) Inventors: Nicholas Roddy, Schenectady, NY (US); Umang Gopalbhai Brahmakshatriya, Niskayuna, NY (US); Hammad Shaikh, Clifton Park, NY (US); Yoshita Jain, Schaumburg, IL (US); John Lahut, Ballston Spa, NY (US); Benedict Lander, Harborcreek, PA (US); David Richard Gibson, North East, PA (US); Bernhard J. Scholz, Ballston Lake, NY (US); David Joseph Schroeck, Erie, PA (US); Jason Quigley, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 356 days.

(21) Appl. No.: 17/710,400

(22) Filed: Mar. 31, 2022

(65) Prior Publication Data
US 2023/0316815 A1 Oct. 5, 2023

(51) Int. Cl.
*G07C 5/00* (2006.01)
*G06Q 10/20* (2023.01)

(52) U.S. Cl.
CPC ............ *G07C 5/006* (2013.01); *G07C 5/008* (2013.01); *G06Q 10/20* (2013.01)

(58) Field of Classification Search
CPC ........ G07C 5/006; G07C 5/008; G06Q 10/20; G05B 23/0283
See application file for complete search history.

(56) References Cited

U.S. PATENT DOCUMENTS

2016/0078695 A1* 3/2016 McClintic ............ G07C 5/0816
701/29.4

FOREIGN PATENT DOCUMENTS

EP 3786902 A1 3/2021

OTHER PUBLICATIONS

Extended European Search Report mailed Jul. 5, 2023 for EP Patent Application No. 23 161 688.9 (7 pages).

* cited by examiner

*Primary Examiner* — Yuen Wong
(74) *Attorney, Agent, or Firm* — K&L Gates LLP (57) ABSTRACT

A system may include a processor to receive vehicle data from a vehicle system at a first location and communicate the data to a second location. The processor may integrate the data into a database of diagnostic data at the second location and identify a diagnostic code that indicates an expected operation of the vehicle system or an unexpected operation. The processor may determine a maintenance operation based on the diagnostic code. A method may include receiving vehicle data from a vehicle system at a first location and communicating the vehicle data to a second location. The method may include integrating the vehicle data into a database of first diagnostic data and identifying a diagnostic code that indicates whether the vehicle data represents an expected operation of the vehicle system or an unexpected operation of the vehicle system. The method may include determining a maintenance operation based on the code.

16 Claims, 4 Drawing Sheets

SYSTEMS AND METHODS FOR EVALUATING REPAIR OF ASSETS

BACKGROUND

Technical Field

The disclosed subject matter relates to systems and methods of evaluating repair of a fleet of assets.

Discussion of Art

Operating a fleet of assets that each operate remotely, such as a fleet of vehicle systems, requires the assets to be maintained or repaired at service centers. Vehicle systems may enter a service center for scheduled or unscheduled maintenance or repair. Technicians at the service center may perform unscheduled maintenance by following instructions sent from a remote diagnostic center. When the maintenance work is completed, the technicians may conduct tests on the vehicle system using software that is provided on the vehicle system. If the vehicle system software indicates that the vehicle system has been sufficiently maintained or repaired, the vehicle system may be approved to return to operation. However, the software on the vehicle system may have limited capability and may not be updated frequently to account for new diagnostic information or techniques. A vehicle system that receives unscheduled maintenance may be determined by the vehicle system software to be sufficiently maintained or repaired, but due to the limited capability of the vehicle system software may not be sufficiently maintained or repaired when it returns to operation.

It may be desirable to have a system and method that differs from those that are currently available.

BRIEF DESCRIPTION

In accordance with one example or aspect, a system of one or more processors may receive vehicle data from a vehicle system at a first location and communicate the vehicle data from the first location to a second location. The processors may integrate the vehicle data into a database of first diagnostic data at the second location and identify one or more first diagnostic codes from the database that indicates whether the vehicle data represents an expected operation of the vehicle system or an unexpected operation of the vehicle system. The processors may determine one or more maintenance operations to perform on the vehicle system based on the one or more first diagnostic codes.

In accordance with one example or aspect, a method may include receiving vehicle data from a vehicle system at a first location and communicating the vehicle data from the first location to a second location remote from the first location. The method may include integrating the vehicle data into a database of first diagnostic data at the second location and identifying one or more first diagnostic codes from the database that indicates whether the vehicle data represents an expected operation of the vehicle system or an unexpected operation of the vehicle system. The method may include determining one or more maintenance operations to perform on the vehicle system based on the one or more first diagnostic codes.

In accordance with one example or aspect, a system may include one or more first processors at a first location and one or more second processors at a second location, the second location remote from the first location. The one or more first processors may collect vehicle data from a vehicle system at the first location and communicate the vehicle data to the one or more second processors. The one or more second processors may integrate the vehicle data into a database of first diagnostic data at the second location and identify one or more first diagnostic codes from the database that indicates whether the vehicle data represents an expected operation of the vehicle system or an unexpected operation of the vehicle system. The one or more second processors may determine one or more maintenance operations to perform on the vehicle system based on the one or more first diagnostic codes.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to systems and methods to evaluate maintenance or repairs required for a fleet of assets that operate remotely, such as a fleet of vehicle systems. The systems and methods also provide for an evaluation of the effectiveness of the maintenance or repairs that are performed prior to the vehicle systems being returned to operation. The systems and methods provide communication between remote diagnostic personnel that review historical diagnostic data of the fleet of vehicle systems and technicians at service centers that perform an initial diagnosis of the vehicle system based on sensor data from the vehicle system that is obtained during operation or at the service center. The service center technicians may identify from the sensor data faults in components or systems of the vehicle system that indicate the components, the systems, and/or the vehicle system are operating unexpectedly. The service center technicians may identify one or more causes of the unexpected operation.

The remote diagnostic center personnel may receive the vehicle system sensor data and the one or more causes (labelled as sub-identification codes) from the service center. The remote diagnostic center may have access to historical vehicle system diagnostic data from the vehicle system and from other vehicle systems in the fleet. The remote service center includes the vehicle system sensor data and the sub-identification codes into a database of the historical vehicle system diagnostic data and identifies one or more first level diagnostic codes from the database. The first level diagnostic codes indicate whether the components and systems of the vehicle system are operating in an expected manner, a possibly unexpected manner, or an unexpected manner. The remote diagnostic center may create a review of the vehicle system and initiate communication with the service center to discuss possible maintenance or repair. The communication may include discussion of the initial diagnosis performed by the service center, possible maintenance and/or repair, and resolution of the case prior, which may include maintenance and repair operations, to releasing the vehicle system back into operation. The remote diagnostic center may provide a score to the process based on the process from the arrival of the vehicle system to the service center to release of the vehicle system from the service center for reporting and/or analysis.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
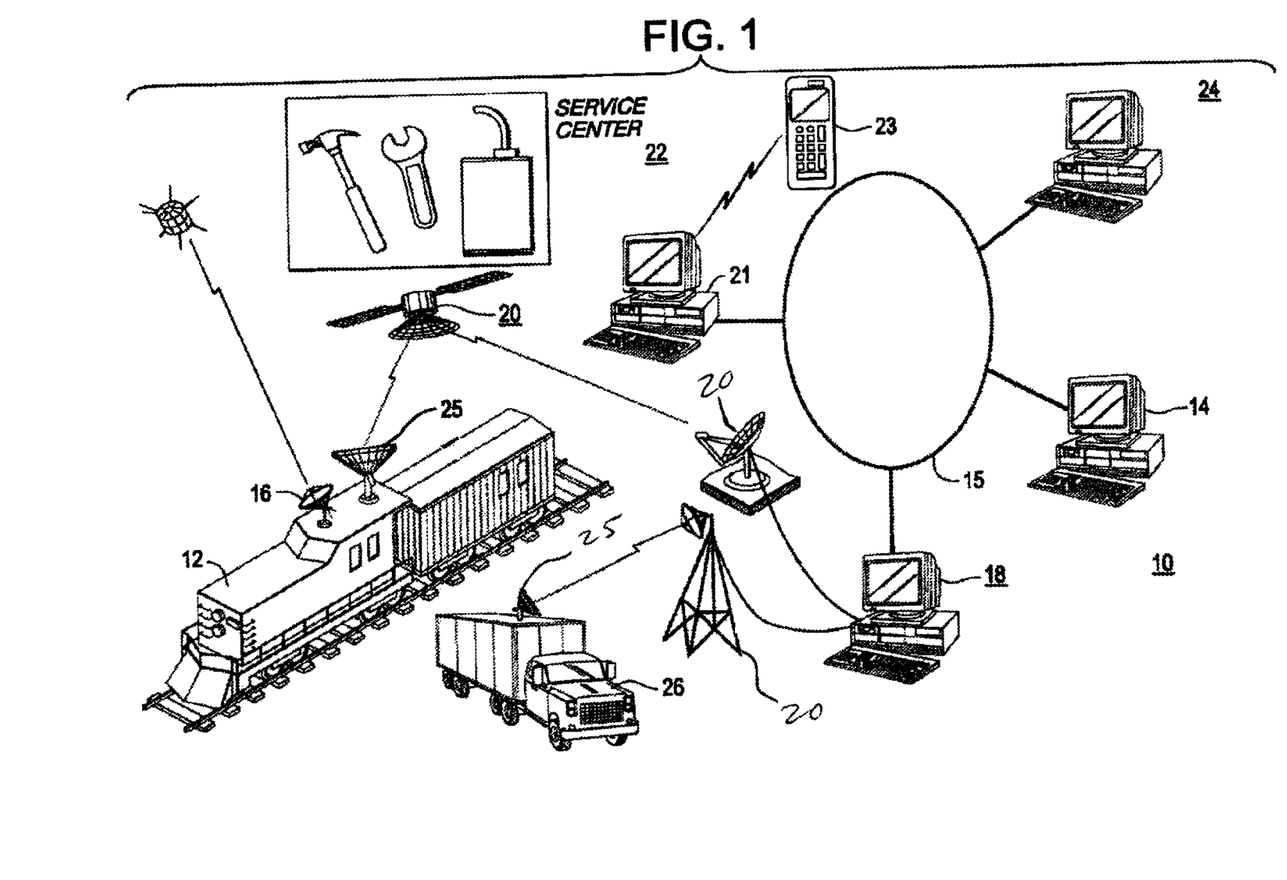
FIG. 1 schematically illustrates a system according to one embodiment.

Referring to FIG. 1, a system 10 is provided for evaluating repair of a fleet of remote assets. The fleet of remote assets may include a fleet of vehicle systems such as rail vehicles 12 and/or trucks 26. The system allows a variety of different users to obtain information regarding each of the mobile assets. According to one embodiment, a user 14 may include a transportation company that owns and/or operates the remote assets. According to one embodiment, a user 24 may include a customer of a transportation company. According to one embodiment, a user may include personnel in an asset service center 22 (e.g., a service shop) and/or personnel in a remote diagnostic center 18. According to one embodiment, a user may include an operator (e.g., a train engineer or a truck driver) that operates each individual asset.

The remote diagnostic center and the service center may both be linked to a network 15 by known types of data connections. According to one embodiment, the network is a global network, such as the Internet, and the remote diagnostic center and the service center may each be linked to the network by computer interfaces through an internet service provider. The network provides a means for communicating between the remote diagnostic center and the service center. The remote diagnostic center and the service center may also be in communication with the users, such as a transportation company, via the network. Other users may be in communication with the remote diagnostic center and/or the service center through links to the network.

Each mobile asset may be equipped with a position determination system 16. According to one embodiment, the position determination system may be a Global Navigation Satellite System (GNSS) receiver, such as a Global Positioning System (GPS) receiver or other satellite-based or local navigation instrument for determining the geographic location of the mobile asset. Data regarding the location of the mobile asset and operating parameters of the mobile asset may be transferred periodically or concurrently from the remote asset by a communication system 25 to the remote diagnostic center by a data link 20, such as a satellite system, a cellular system, an optical or infrared system, a hard-wired phone line, etc. The communication system of the asset may include a transceiver for transmitting information, including position information and operating parameters, and for receiving information from other devices and users in the system.

The service center may include a computer(s) 21 and/or a mobile device(s) 23. The mobile device(s) may be a smartphone, a tablet, or personal digital assistant device. The service center computer(s) and the mobile device(s) may be connected to the network, for example through an internet service provider or a cellular service provider. The computer(s) and/or the mobile device(s) may communicate with each asset, other devices or users of the system, and/or the remote diagnostic center through the data links.

The service center may perform scheduled maintenance on a vehicle system and/or may perform unscheduled maintenance on a vehicle system that arrives at the service center. The vehicles system may arrive at the service center on a scheduled basis or may arrive at the service center on an unscheduled basis. The vehicle system may arrive on an unscheduled basis due to an operator of the vehicle system determining that the vehicle system is operating in an unexpected manner. For example, a sensor may provide a notification to the operator that an operating parameter of the vehicle system indicates that the vehicle system is not operating in an expected manner. The maintenance operation performed may include replacement of a part and/or a system of the vehicle system that are scheduled for replacement due to an age and/or use of the part and/or system. The maintenance operation performed may include a repair operation to replace a part and/or a system that has been damaged and/or failed. The repair operation may include a repair of the part and/or system or a replacement of the part and/or system.

Figure 2:
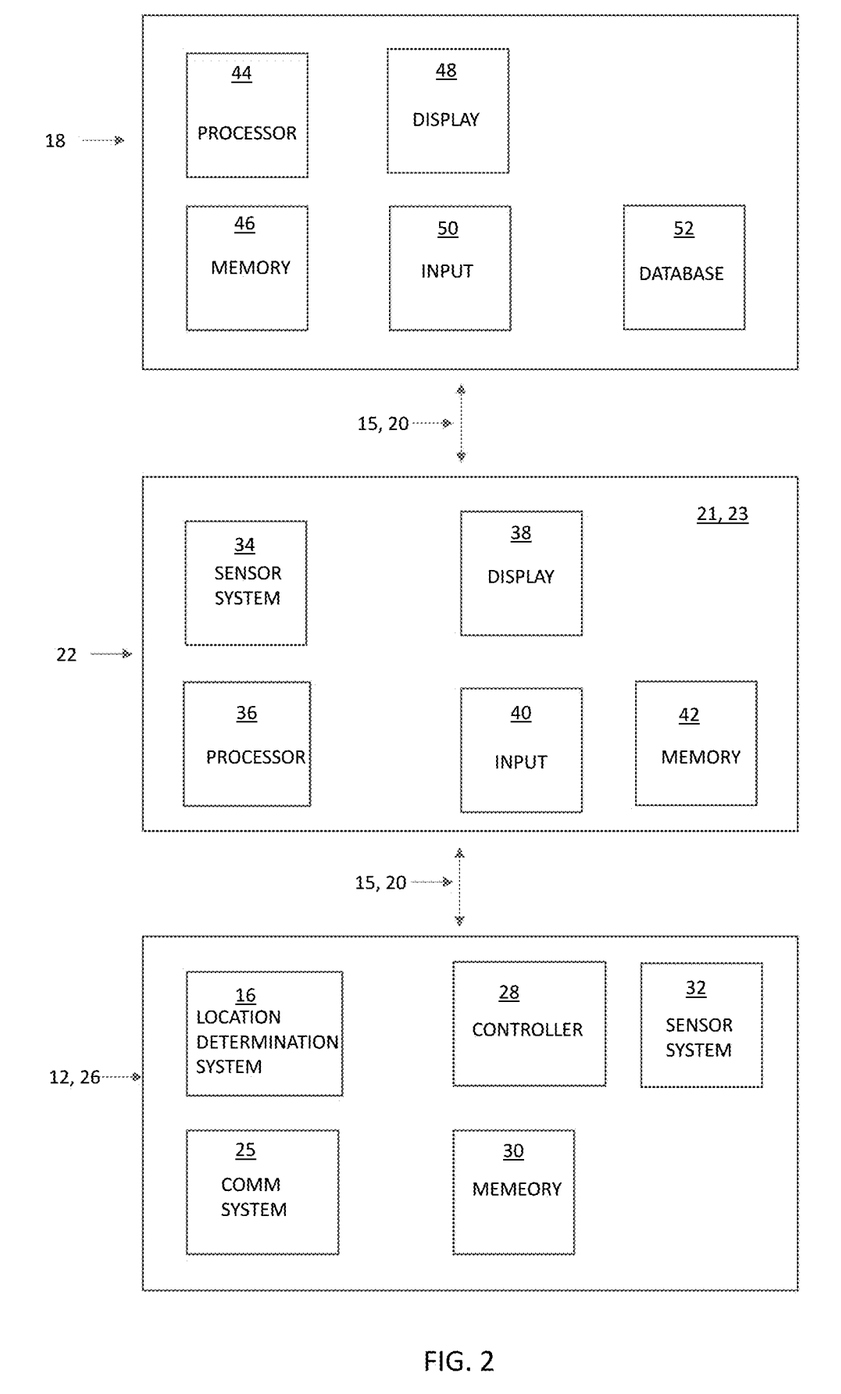
FIG. 2 schematically illustrates a system according to one embodiment.

Referring to FIG. 2, each vehicle system may be equipped with a sensor system 32 including a plurality of sensors for monitoring a plurality of operating parameters representative of the condition of the vehicle system and the efficiency of operation of the vehicle system. The sensors may include temperature sensors to sense a temperature of a part, a component, and/or a system of the vehicle system. The temperature sensors may sense a temperature of a fluid, such as a lubricant, of the vehicle system. The sensors may include a pressure sensor to sense a pressure. For example, a pressure sensor may sense a pressure of a brake fluid of a brake system. The sensors may include a voltage sensor and/or a current sensor to sense a voltage and/or a current of the vehicle system. For example, a sensor or sensors may determine a voltage and/or a current supplied by a battery or bank of batteries of the vehicle system. As used herein, the term "sensor" may include any sensor that senses or detects any characteristic or operating parameter of the vehicle system and the term "sensor system" may include any sensor or one or more sensor systems that sense or detect characteristics or operating parameters of the vehicle system.

The vehicle system sensor system may sense characteristics and operating parameters of the vehicle system as the vehicle system operates outside of the service center. The vehicle system may include a memory that stores sensor readings as the vehicle system operates, for example within a transportation network. The vehicle system may include a control system or controller 28 that controls operation of the vehicle system. The controller may execute one or more feedback control loops to operate the vehicle system within one or more operating parameters. The controller may generate diagnostic data that indicates that one or more operating parameters exceeds one or more threshold values. The diagnostic data of the vehicle system may be stored in the memory of the vehicle system. According to one embodiment, the controller executes the one or more feedback control loops at one or more throttle settings of the vehicle system and generates and stores diagnostic data at the one or more throttle settings.

The service center may include a sensor system 34 that may be provided to the vehicle system when the vehicle system arrives at the service center. The service center sensor system may be provided to vehicle systems that are at the service center and do not include sensors for sensing some characteristics or operating parameters of the vehicle system. For example, the service center sensor system may include a plurality of sensors that are connected together, for example by a wire harness, and placed on the vehicle system to sense or detect characteristics or operating parameters of the vehicle system at locations or for components or systems that are not sensed or detected by the vehicle system sensor system. The service center sensor system may obtain sensor data from the vehicle system while the vehicle system is idling in the service center. The service center sensor system may obtain sensor data from the vehicle system at other operating levels of the vehicle system while it is in the service center.

The service center may include one or more processors 36. The one or more processors may be provided in the service center computer and/or mobile device. The service center computer and/or mobile device may include a display 38 and an input 40 that service center personnel may use to cause the one or more processors to execute instructions stored in a memory 42.

When a vehicle system arrives at the service center sensor data from the vehicle system sensor system and/or the vehicle system sensor system may be transmitted or communicated to the computer and/or the mobile device of the service center. The sensor data may be communicated or transmitted wirelessly, for example through the network links or the data links. The sensor data may also be transmitted to the computer and/or the handheld device by a wired connection. The computer and/or the handheld device may store the sensor data in the memory of the computer and/or the handheld device. The one or more processors of the computer and/or handheld device may execute or run a software program that reviews the sensor data and determines if any of the sensor data indicates that a fault may exist. For example, the sensor data may indicate that one or more components or systems of the vehicle system is faulty or not operating within expected parameters. The one or more processors may determine one or more sub-identifications of the fault from the sensor data. The one or more sub-identifications may identify one or more causes of the fault. The sensor data and the fault data including any sub-identifications may form vehicle diagnostic data that may be used to determine if the vehicle system requires any maintenance or repair.

The computer and/or handheld device of the service center may transmit or communicate the vehicle diagnostic data to the remote diagnostic center. The remote diagnostic center may include a memory 46 and one or more processors 44. The memory may include instructions executable by the one or more processors to implement the methods or portions of the methods disclosed herein. The memory may store the vehicle diagnostic data of the vehicle system transmitted or communicated from the service center.

The remote service center may include a database 52 of historical diagnostic data. The historical diagnostic data may include sensor data and fault data from previous service operations on the vehicle system and other vehicle systems from the service center and/or from other service centers. The historical diagnostic data may include data regarding maintenance and/or repairs done to vehicle system previously and/or to other vehicles by the service center and/or other service centers. The one or more processors of the remote diagnostic center may integrate the vehicle diagnostic data stored in the memory into the historic diagnostic database.

The one or more processors may insert into the vehicle diagnostic data one or more diagnostic codes that indicates the vehicle system is operating in an expected manner, in a possibly expected manner, or in an unexpected manner. The one or more processors may, for example, determine that a component or system of the vehicle system may be operating in an unexpected manner, but the vehicle system is operating in an expected manner. As another example, the one or more processors of the remote diagnostic center may determine that one or more components or systems of the vehicle system are operating in a possibly unexpected manner and/or an unexpected manner and the vehicle system is operating in a possibly unexpected manner or an unexpected manner.

The one or more processors of the remote diagnostic center may determine, based on the vehicle diagnostic data and the one or more diagnostic codes from the historical diagnostic data that the maintenance of the vehicle system requires review by the service center and the remote diagnostic center. Personnel at the remote diagnostic center may, during the review, review the sensor data from the vehicle system and the diagnostic review of the vehicle sensor data performed at the service center. The one or more processors of the remote diagnostic center may initiate a communication with the service center to provide a discussion between personnel of the remote diagnostic center and the service center. The communication may be, for example, a chat function between a computer and/or handheld device of the remote diagnostic center and a computer and/or handheld device of the service center that provides for written communication between the remote diagnostic center and the service center. The communication may be, for example, a video conference between the remote diagnostic center and the service center.

Figure 3:
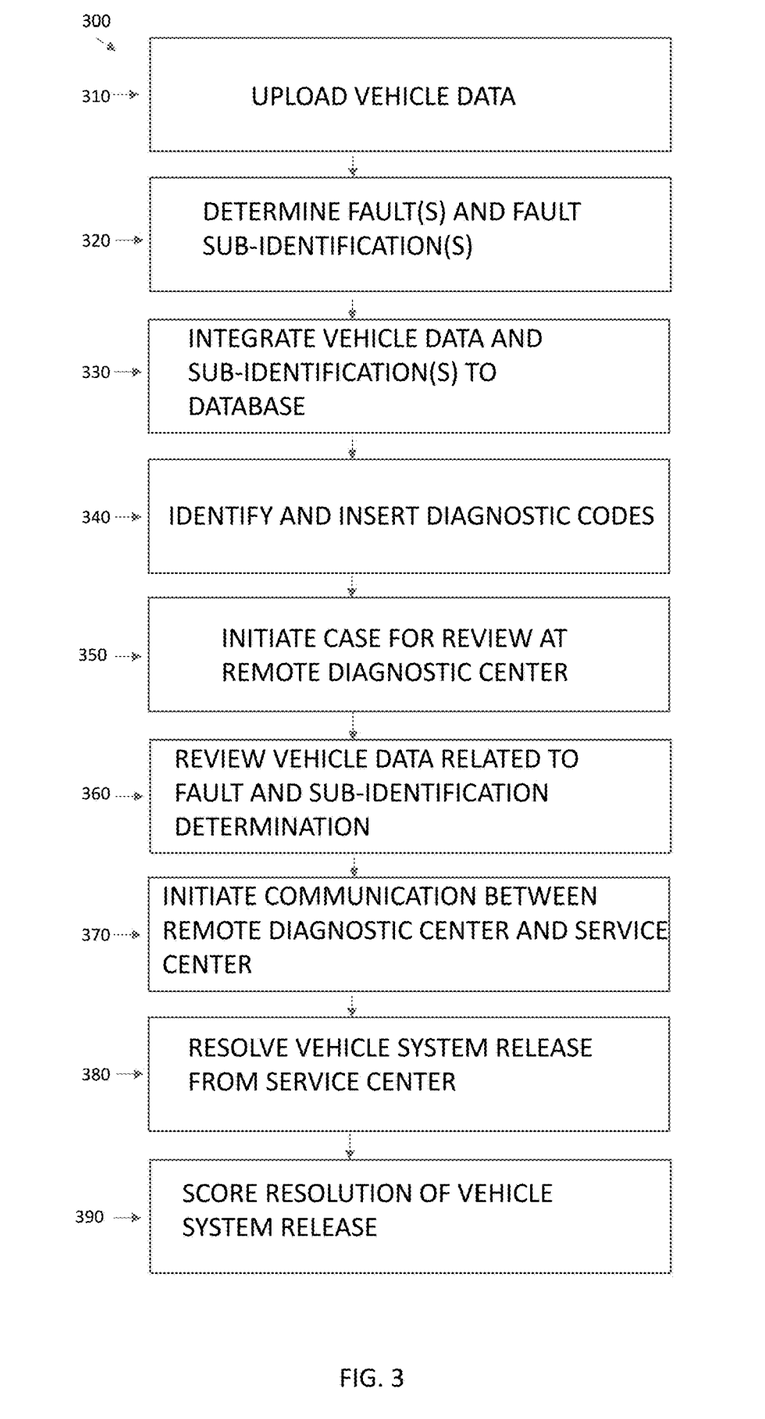
FIG. 3 schematically illustrates a method according to one embodiment.

Referring to FIG. 3, a method 300 according to one embodiment may include a step 310 of uploading vehicle data from a vehicle system to a computing device, such as a computer handheld device, at a service center. The vehicle data may include sensor data obtained during operation of the vehicle system prior to arriving at the service center or from operation of the vehicle system in the service center. The sensor data may be obtained from sensors that are provided on the vehicle system during operation prior to arrival or sensors that are provided on the vehicle system after arrival at the service center. The method may include a step 320 of determining from the vehicle data one or more faults in the operation of one or more components or systems of the vehicle system and one or more sub-identifications of possible causes of the one or more faults.

The method may include a step 330 of integrating the vehicle data and the sub-identifications into a database of diagnostic data at a remote diagnostic center that is remote from the service center. The database of diagnostic data may include vehicle data from vehicle systems that have previously been at the service center, including the vehicle system currently at the service center. The method may include a step 340 of identifying from the vehicle data and sub-identifications diagnostic codes and inserting the diagnostic codes into the database. The diagnostic codes indicate whether the vehicle data represents that the vehicle system is operating in an expected manner, a possibly unexpected manner, or an unexpected manner.

The method may include a stop 350 initiating at the remote diagnostic center a case for review with a technician of the service center. The method may include a step 360 of reviewing the vehicle data uploaded at the service center and the sub-identifications that may determine the cause of one or more faults in the operation of one or more components or systems of the vehicle system. The method may include a step 370 of initiating a communication between the remote diagnostic center and the service center. The communication may include discussion of the vehicle data and the determination of any faults and their sub-identifications determined at the service center. The communication may include discussion of maintenance and repair operations to be performed on the vehicle system.

The method may include a step 380 of resolving the release of the vehicle system from the service center. The resolution of the release may include documentation of the communication between the service center and the remote diagnostic center. The resolution may include a determination of any maintenance or repair operations performed on the vehicle system, and the effectiveness of the maintenance or repair. The method may include a step 390 of scoring the process to document the resolution of the release of the vehicle system from the service center. The score may be reported to the vehicle system owner or user to report the release and to allow analysis of the process from the arrival of the vehicle system to the service center to release from the service center.

Figure 4:
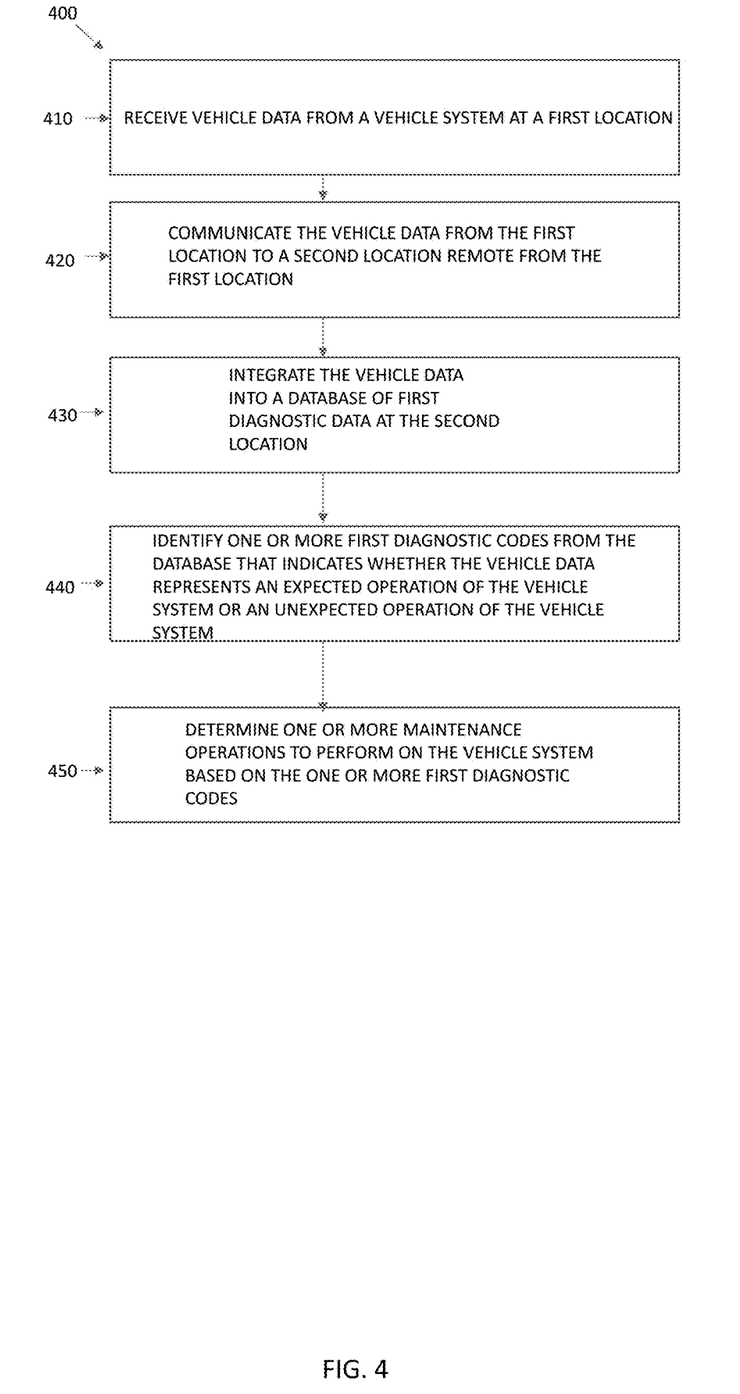
FIG. 4 schematically illustrates a method according to one embodiment.

Referring to FIG. 4, a method 400 according to one embodiment may include a step 410 of collecting vehicle data from a vehicle system at a first location and a step 420 of communicating the vehicle data from the first location to a second location remote from the first location. The method may include a step 430 of integrating the vehicle data into a database of first diagnostic data at the second location and a step 440 identifying one or more first diagnostic codes from the database that indicates whether the vehicle data represents an expected operation of the vehicle system or an unexpected operation of the vehicle system. The method may include a step 450 of determining one or more maintenance operations to perform on the vehicle system based on the one or more first diagnostic codes.

According to one embodiment, a method may include performing one or more of repair operation or a replacement operation on a vehicle system based on one or more of the sub-identifications identified from the vehicle system data collected during operation of the vehicle system during operation and/or during operation in the service center. The repair and/or replacement operation may be based on one or more of the diagnostic codes from the database of diagnostic data. The repair and/or replacement operation may be based on the score of the release of the vehicle system from the service center. For example, according to one embodiment a component or system, such as a pump, a sensor, a valve, a circuit, or parts of a brake system or throttle system may be repaired. According to one embodiment, a component or system may be replaced.

Integrating the vehicle data and the fault sub-identification(s) into the database improves the ability of the system to determine a diagnostic code(s) that correctly identifies the required maintenance and/or repair. The database may include data of similar vehicle systems with similar fault sub-identifications that provide a more accurate determination of the required maintenance or repair or replacement for the vehicle system at the service center. The use of artificial intelligence (AI) and/or machine learning (ML) techniques may allow the processors to identify a required maintenance or repair or replacement faster than currently available methods and systems. Review of the upload of the vehicle system data at the service center and the determination of the fault sub-identification(s) by the processor(s) of the remote diagnostic center allows for review of the parametric data of the vehicle system data at the remote diagnostic center which may improve the identification and insertion of the diagnostic code(s). Determining a score of the release of the vehicle system from the service center may provide improved diagnostics and result in less repeat failures of the vehicle system.

A system may include one or more processors to receive vehicle data from a vehicle system at a first location and communicate the vehicle data from the first location to a second location. The one or more processors may integrate the vehicle data into a database of first diagnostic data at the second location and identify one or more first diagnostic codes from the database that indicates whether the vehicle data represents an expected operation of the vehicle system or an unexpected operation of the vehicle system. The one or more processors may determine one or more maintenance operations to perform on the vehicle system based on the one or more first diagnostic codes.

The vehicle data may include sensor data collected from sensors during operation of the vehicle system.

The sensor data may be collected during idling of the vehicle system.

The sensor data may be collected at a designated throttle setting of the vehicle system.

The vehicle data may be second diagnostic data from the vehicle system.

The second diagnostic data may be obtained from a feedback loop of a control system of the vehicle system.

The second diagnostic data may indicate if one or more operating parameters of the vehicle system exceeds a threshold value.

The one or more processors may include an algorithm configured to identify the one or more first diagnostic codes.

The algorithm may be configured to determine the one or more maintenance operations.

The one or more processors may initiate communication between the first location and the second location.

The one or more processors may receive from the second location a score based on one or more of second diagnostic data determined at the first location, the communication between the first location and the second location, the determination of the one or more maintenance operations, or a completion of the one or more maintenance operations.

A method may include receiving vehicle data from a vehicle system at a first location and communicating the vehicle data from the first location to a second location remote from the first location. The method may include integrating the vehicle data into a database of first diagnostic data at the second location and identifying one or more first diagnostic codes from the database that indicates whether the vehicle data represents an expected operation of the vehicle system or an unexpected operation of the vehicle system. The method may include determining one or more maintenance operations to perform on the vehicle system based on the one or more first diagnostic codes.

The vehicle data may include sensor data collected from sensors during operation of the vehicle system.

The sensor data may be collected during idling of the vehicle system.

The sensor data may be collected at a designated throttle setting of the vehicle system.

The vehicle data may be second diagnostic data from the vehicle system.

The second diagnostic data may be obtained from a feedback loop of a control system of the vehicle system.

The second diagnostic data may indicate if one or more operating parameters of the vehicle system exceeds a threshold value.

The method may include implementing an algorithm configured to identify the one or more first diagnostic codes.

The algorithm may determine the one or more maintenance operations.

The method may include the first location initiating communication with one or more of the vehicle system or the second location.

The method may include receiving from the second location a score based on one or more of second diagnostic data determined at the first location, the communication between the first location and the second location, the determination of the one or more maintenance operations, or a completion of the one or more maintenance operations.

A system may include one or more first processors at a first location and one or more second processors at a second location. The second location may be remote from the first location. The one or more first processors may receive vehicle data from a vehicle system at the first location and communicate the vehicle data to the one or more second processors. The one or more second processors may integrate the vehicle data into a database of first diagnostic data at the second location and identify one or more first diagnostic codes from the database that indicates whether the vehicle data represents an expected operation of the vehicle system or an unexpected operation of the vehicle system. The one or more second processors may determine one or more maintenance operations to perform on the vehicle system based on the one or more first diagnostic codes.

The vehicle data may include sensor data collected from sensors during operation of the vehicle system.

The one or more first processors may determine second diagnostic data from the vehicle system.

The second diagnostic data may be obtained from a feedback loop of a control system of the vehicle system.

The second diagnostic data may indicate if one or more operating parameters of the vehicle system exceeds a threshold value.

The one or more second processors may include an algorithm to identify the one or more first diagnostic codes.

The algorithm may determine the one or more maintenance operations.

The one or more second processors are configured to initiate communication with the one or more first processors.

The one or more second processors may receive from the second location a score based on one or more of second diagnostic data determined by the one or more first processors, the communication between the one or more first processors and the one or more second processors, the determination of the one or more maintenance operations, or a completion of the one or more maintenance operations.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario.

Additionally, the success metric may be a combination of the optimized outcomes, which may be weighed relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended clauses, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

The invention claimed is:

1. A system comprising:
a sensor system disposed at a first location; and
one or more processors configured to:
receive first diagnostic data from a control system of a vehicle system at the first location;
communicate with the control system the vehicle system;
receive from the vehicle system via the sensor system when the sensor system is associated with the vehicle system, second diagnostic data in response to the communication with the vehicle system;
initiate a communication between a first device at the first location and a second device at a second location;
transmit the first diagnostic data via the first device at the first location to the second device at the second location;
integrate the first diagnostic data into a database of first diagnostic data at the second location;
identify one or more first diagnostic codes from the database that indicates whether the first diagnostic data represent an expected operation of the vehicle system or an unexpected operation of the vehicle system;
determine one or more maintenance operations to perform on the vehicle system based on the one or more first diagnostic codes; and
replacing or repairing a vehicle part or system during the one or more maintenance operations,
wherein the second diagnostic data are received from a feedback loop of the control system of the vehicle system in communication with the one or more processors via the sensor system, and
wherein the sensor system comprises one or more sensors to sense or detect:
characteristics or operating parameters of the vehicle system at locations, or
components or systems that are not sensed or detected by a vehicle system sensor system.

2. The system of claim 1, wherein the first diagnostic data comprise sensor data received from sensors of the vehicle system sensor system during operation of the vehicle system.

3. The system of claim 2, wherein the sensor data are received from the sensors during idling of the vehicle system.

4. The system of claim 2, wherein the sensor data are received from the sensors at a designated throttle setting of the vehicle system.

5. The system of claim 1 wherein the second diagnostic data indicate when one or more operating parameters of the vehicle system exceed a threshold value.

6. The system of claim 1, wherein the one or more processors are configured to identify the one or more first diagnostic codes from the database.

7. The system of claim 6, wherein the one or more processors are configured to determine the one or more maintenance operations based at least in part on the one or more first diagnostic codes.

8. The system of claim 1, wherein the one or more processors are configured to receive from the second location a score based on the second diagnostic data determined at the first location, the communication between the first location and the second location, the determination of the one or more maintenance operations, or a completion of the one or more maintenance operations.

9. A method comprising:
contacting a sensor system to a vehicle system at a first location, wherein the sensor system comprises one or more sensors to sense or detect:
  characteristics or operating parameters of the vehicle system at locations, or
  components or systems that are not sensed or detected by a vehicle system sensor system;
receiving first diagnostic data from a control system of the vehicle system at the first location;
communicating with the control system of the vehicle system;
receiving, in response to the communication with the control system of the vehicle system, second diagnostic data obtained from a feedback loop of a control system of the vehicle system;
initiating a communication between a first device at the first location and a second device at a second location;
transmitting the first diagnostic data via the first device at the first location to the second device at the second location remote from the first location;
integrating the first diagnostic data into a database of first diagnostic data at the second location; and
identifying one or more first diagnostic codes from the database that indicate whether the first diagnostic data represent an expected operation of the vehicle system or an unexpected operation of the vehicle system; and
determining one or more maintenance operations to perform on the vehicle system based on the one or more first diagnostic codes; and
replacing or repairing a vehicle part or system during the one or more maintenance operations.

10. The method of claim 9, wherein the first diagnostic data comprise sensor data received from sensors of the vehicle system sensor system during operation of the vehicle system.

11. The method of claim 10, wherein the sensor data are received from the sensors during idling of the vehicle system.

12. The method of claim 10, wherein the sensor data are received from the sensors at a designated throttle setting of the vehicle system.

13. The method of claim 9, wherein the second diagnostic data indicate when one or more operating parameters of the vehicle system exceeds a threshold value.

14. A system comprising:
a sensor system disposed at a first location;
one or more first processors at the first location; and
one or more second processors at a second location, the second location remote from the first location, wherein:
  the one or more first processors are configured to:
    receive first diagnostic data from a control system of a vehicle system at the first location;
    communicate with the control system the vehicle system;
    receive from the vehicle system via the sensor system when the sensor system is associated with the vehicle system, second diagnostic data in response to the communication with the vehicle system;
    initiate a communication between the one or more first processors at the first location and the one or more second processors at the second location; and
    transmit the first diagnostic data to the one or more second processors; and
  the one or more second processors are configured to:
    integrate the first diagnostic data into a database of first diagnostic data at the second location;
    identify one or more first diagnostic codes from the database that indicates whether the first diagnostic data represent an expected operation of the vehicle system or an unexpected operation of the vehicle system;
    determine one or more maintenance operations to perform on the vehicle system based on the one or more first diagnostic codes; and
    replace or repair a vehicle part or system during the one or more maintenance operations,
  wherein the second diagnostic data are received from a feedback loop of the control system of the vehicle system, and
  wherein the sensor system comprises one or more sensors to sense or detect:
    characteristics or operating parameters of the vehicle system at locations; or
    components or systems that are not sensed or detected by a vehicle system sensor system.

15. The system of claim 14, wherein the first diagnostic data comprise sensor data received from sensors during operation of the vehicle system.

16. The system of claim 14, wherein the second diagnostic data indicate when one or more operating parameters of the vehicle system exceeds a threshold value.

* * * * *